May 7, 1963 W. W. HAY 3,088,810
CARBON DIOXIDE ABSORBER
Filed Dec. 15, 1958 2 Sheets-Sheet 2
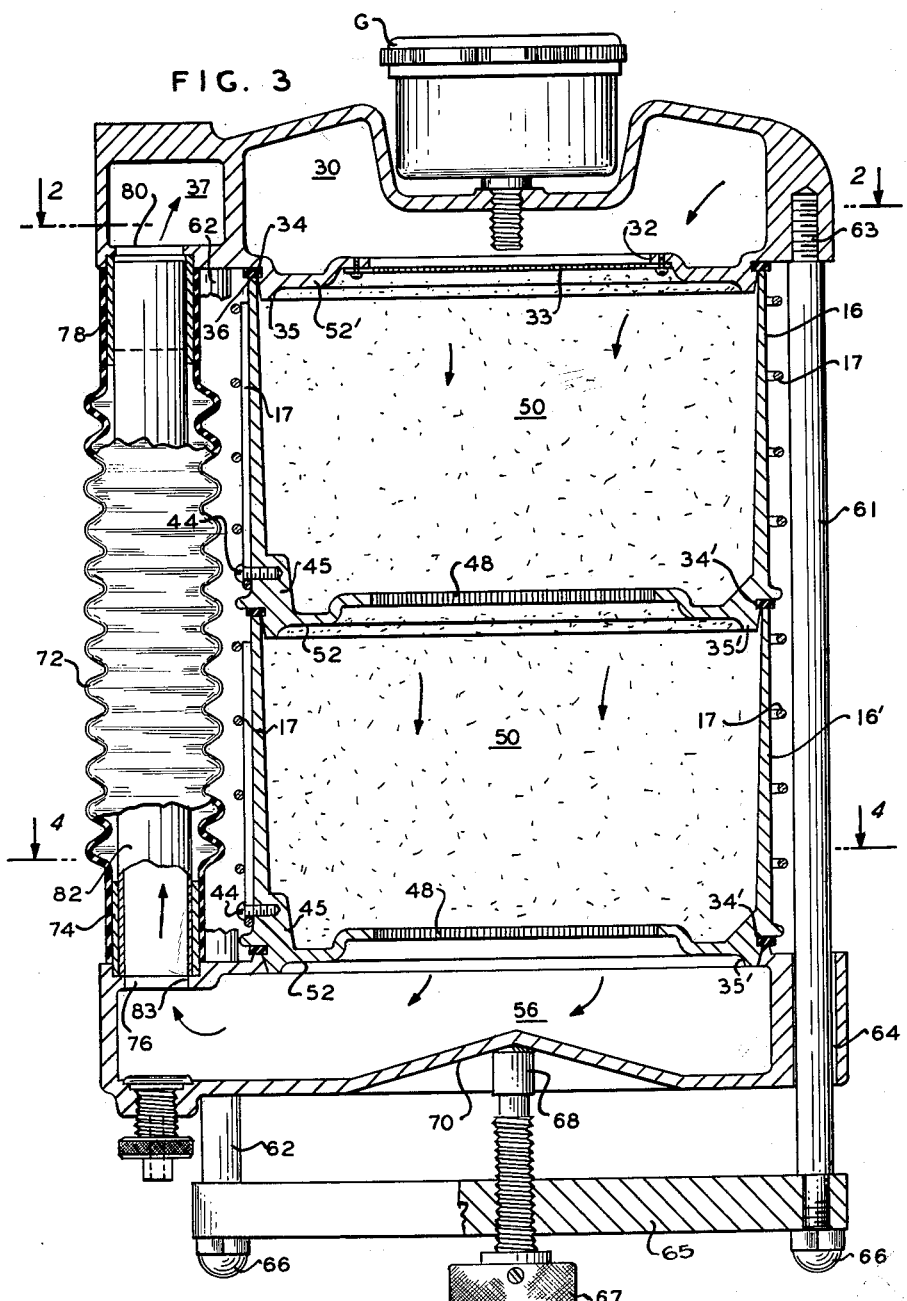
FIG. 3
FIG. 6
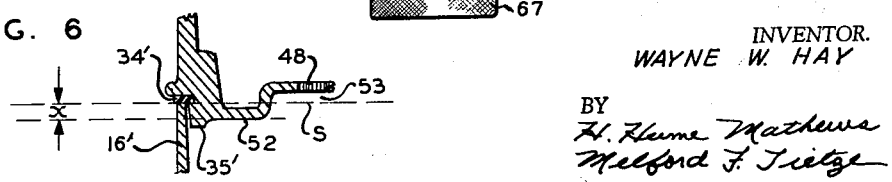
INVENTOR.
WAYNE W. HAY
BY
ATTORNEY & AGENT United States Patent Office  3,088,810
Patented May 7, 1963

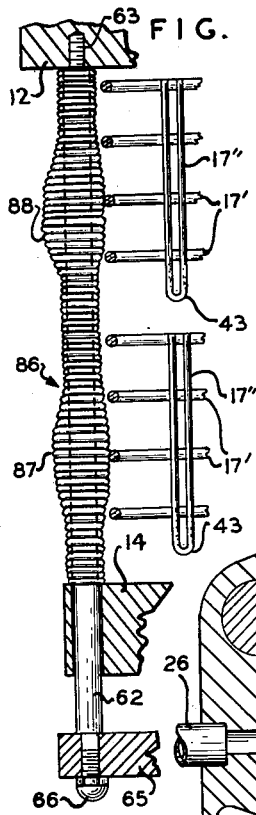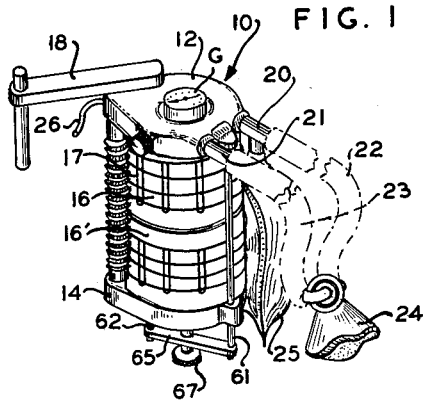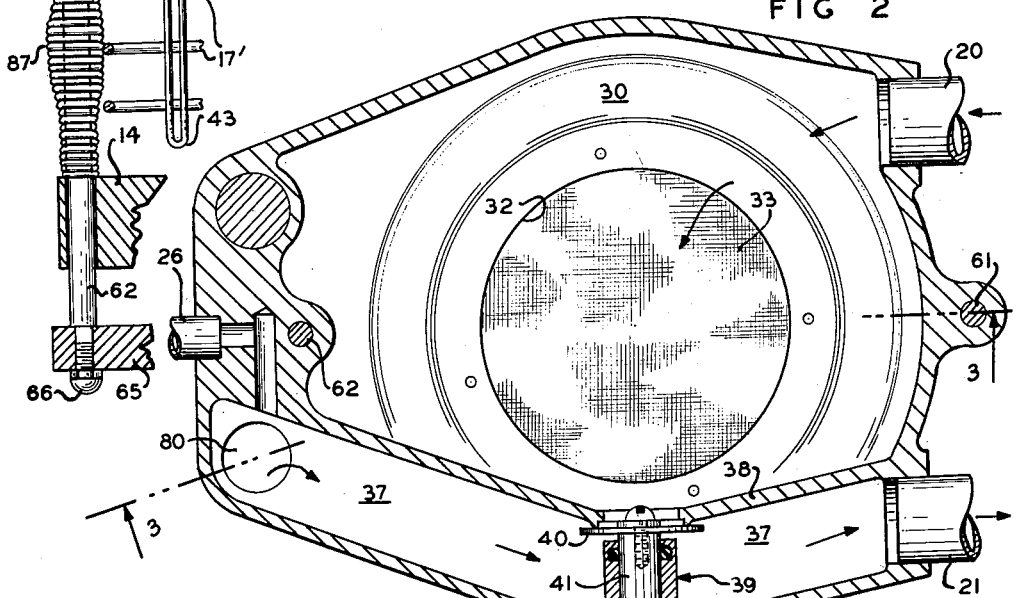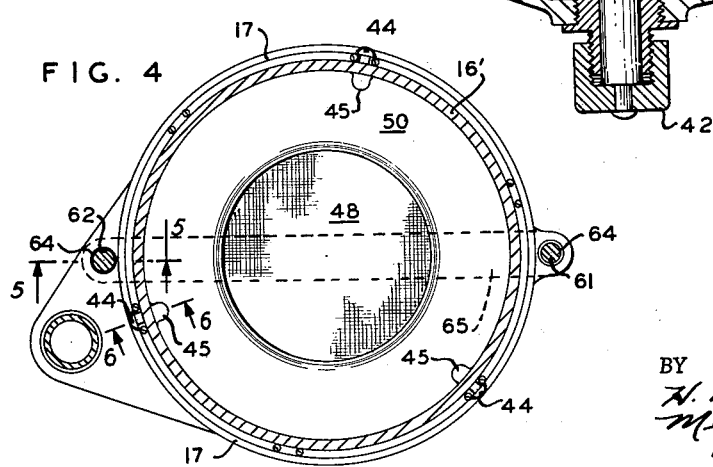

3,088,810
CARBON DIOXIDE ABSORBER
Wayne W. Hay, Madison, Wis., assignor to Air Reduction Company, Incorporated, New York, N.Y., a corporation of New York
Filed Dec. 15, 1958, Ser. No. 780,440
7 Claims. (Cl. 23—252)

This invention relates to apparatus for absorbing carbon dioxide from respiratory gases containing an anesthetic vapor administered to patients undergoing anesthesia.

This type of apparatus is frequently referred to as an anesthetic absorber and in its conventional form includes a suitable canister or container which holds a supply of an absorbent material, such as soda lime, which is effective in the presence of the respiratory gases circulated therethrough to remove the carbon dioxide. In a popular form of absorbent now increasingly in use, the soda lime is provided with an indicator agent which, in the course of absorption and subsequent depletion of the absorptive capacity of the charge gradually changes color. For example, one such soda lime absorbent contains ethyl violet which changes color from white to purple as the absorptive capacity of the absorbent becomes exhausted. With this type of absorbent charge, removal of the canister and inspection of the absorbent, permits a ready determination as to its general condition and remaining absorptive capacity. In this way, the need for replacement of the charge can be easily recognized.

While the use of a color indicator in the soda lime facilitates a determination as to its absorptive capacity, it has been necessary to at least partially dismantle the apparatus. This is generally inconvenient and sometimes presents a cumbersome and difficult task, such as when the apparatus is in use. There is, therefore, a strong-felt need for suitable means for permitting an inspection of the absorbent material without requiring any detachment or removal of any part of the anesthetic apparatus. Accordingly, it is an object of the present invention to provide a compact and easily replaceable canister means for holding a charge of carbon dioxide absorbent material having substantially transparent sidewalls permitting observation of the charged material without removal of the canister means.

Although the provision of such transparent canister means enables direct visual observation of the carbon dioxide absorbent whose change in color evidences the depletion of the absorbent, such an arrangement encounters difficulties in that the external strata of the charge may not truly represent the corresponding cross sections due to a frequent tendency of the gases to channel through localized regions of the charge. In addition, when the entire charge is contained in a single canister of relatively large volume, there may be a tendency, even though a gradual change in the absorbent is visibly indicated to the operator, to delay replacement of the charge until substantially the entire absorptive capacity thereof has been utilized. In such instances, toward the end of the useful life of the charge, absorption may not be accomplished efficiently and carbon dioxide concentrations of a higher level than are desirable are frequently found to exist.

It is, therefore, a further object of this invention to provide a carbon dioxide absorber device for use particularly in anesthetic administering apparatus having transparent canister means wherein the canister is in the form of at least two separable compartments mounted together to form successive beds of absorbent to be contacted with the respiration gases passed in series flow therethrough and wherein the absorber device includes special fixture means for accommodating the canister arrangement and facilitating their recharging and replacement.

It is a still further object of the present invention to provide such a carbon dioxide absorber wherein said separable compartments of the canister means are provided in the form of individual transparent canisters of substantially identical configuration having perforated bottoms for the support of an absorbent charge placed therein and open at the top and adapted to be nested in end-to-end relation to form a series of at least two and wherein the absorber device includes relatively movable housing portions to secure the assembled canisters therebetween.

It is a still further object of the present invention to provide such a carbon dioxide absorber device wherein one of the relatively movable absorber housing portions is provided with inlet and outlet gas fixture means for connecting said absorber with the respiration circuit and having means for conducting gases lengthwise through the assembled canisters mounted therein and having extensible conduit means external to the canisters interconnecting the relatively movable housing portions to furnish a closed flow circuit for the gases through the assembled canisters between said gas inlet and outlet and which is effective to accommodate the relative movement of said absorber housing portions.

It is a further object of the invention to provide in such absorber means an arrangement for minimizing the short circuit flow of respiratory gases through the bed strata immediately adjacent to the walls of the canisters.

Other objects and advantages of the present invention will be more fully understood by reference to the following description of a preferred embodiment thereof and to the accompanying drawings in which:

FIG. 1 is a perspective view of a portion of an anesthetic circuit showing a carbon dioxide absorber device constructed in accordance with a preferred embodiment of the present invention showing a plurality of nested canister elements removably mounted between relatively movable upper and lower absorber housings;

FIG. 2 is a plan sectional view taken horizontally through the upper absorber housing portion seen in FIG. 1;

FIG. 3 is a vertical sectional view taken longitudinally through the vertically arranged canisters substantially along the longitudinal axis thereof along the line 3—3 in FIG. 2, looking in the direction of the arrows;

FIG. 4 is a cross-sectional view taken substantially along the line 4—4 as shown in FIG. 3 and looking in the direction of the arrows;

FIG. 5 is a partial sectional view taken along the line 5—5 in FIG. 4, showing one of the vertical supporting rods carrying the lower absorber housing and electrical grounding means carried thereon; and, FIG. 6 is a partial sectional view taken along the line 6—6 in FIG. 4 illustrating the detailed spacial relation of the nested canister arrangement.

A carbon dioxide absorber, according to the present invention, is designated generally at 10 in FIG. 1 of the drawing which, it will be seen, includes an upper housing 12 and a lower housing 14 between which is secured a vertically arranged series of assembled transparent canisters 16 and 16′. The canisters are provided with grounded, protective cages 17 to prevent accumulation of static electric charges thereon. The absorber is supported in a desired position during use by means of a suitable mounting fixture 18 rotatably connected with the upper absorber housing 12. The supporting fixture 18 may, in turn, be carried by a conventional anesthetic gas machine, not shown, such as any one of the type commonly used for administering anesthetic gases. The absorber has an inlet 20 and an outlet 21 which it will be understood are connected when the absorber is in use in a conventional closed anesthetic circuit. Thus, corrugated breathing tubes 22 and 23 are shown as attached respectively to the absorber connecting fittings which are received on a face mask 24 that is placed over the face of a patient. A reservoir bag 25 is also conventionally included as part of the circuit. The patient's breathing is thereby confined to the anesthetic circuit formed by the absorber and connecting conduits with the face mask so that the patient's exhalation gases pass to the inlet 20 of the absorber, are circulated through the absorber to the outlet 21, and, thence are returned to the face mask for inhalation. Oxygen is added to the closed circuit to replenish the oxygen consumed from the circulating gases by the patient. This may be accomplished, for example, by the attachment of an oxygen delivery conduit 26 received on a gas connecting fitting on the absorber housing. Anesthetic vapors which are required for administration to the patient may be delivered through the conduit 26 in admixture with the oxygen or alternatively the closed circuit respiratory gases may be passed through a suitable in-circuit vaporizer. Such expedients as well as other arrangements for administering the required oxygen and anesthetic vapors to the patient in such circuits and systems are well known in the art. It will be seen, however, that in such systems in connection with which the present absorber device is particularly intended for use wherein the patient's exhalation is recirculated, provision is made for the passage of such gases through an absorber for the removal of carbon dioxide therefrom.

Referring now to the sectional views shown in FIGS. 2 and 3, it will be seen that the inlet 20 of the upper absorber housing opens into an inlet chamber 30. An opening 32 from the chamber 30 is formed in the bottom wall of the housing as best seen in FIG. 2 which is provided with a protective screen 33 that is intended to prevent the entry of foreign matter into the chamber 30. A pressure gauge G is mounted at the top of the absorber housing to afford a reading of the gas pressure within the absorber.

The bottom face of the upper absorber housing is provided with a flat annular seating surface surrounding the bottom opening 32 against which a sealing gasket 34 is retained. A downwardly projecting flange 35 extends concentrically around the inner perimeter of the seating gasket and is slightly chamfered to facilitate the seating of the upper end 36 of the canister 16 against the gasket as shown. A radial recess is provided at the base of the flange 35 for accommodation of the gasket and assistance in retaining the gasket in place. It will be seen that the gasket may be made of a slightly elastic material such as rubber and that by stretching it over the flange 35 its subsequent contraction will act to hold the gasket in place.

The outlet fitting 21 of the upper absorber housing, FIG. 2, connects with an outlet chamber 37 that is divided from the chamber 30 by a wall partition 38. As will be hereinafter more fully described, the gases delivered to the absorber are conveyed for the most part from the chamber 30 downwardly through the assembled canisters to the lower housing 14 thence back to the outlet chamber 37 from where they discharge through the outlet 21 for return to the patient. However, it may be desired to bypass a portion of the respiratory gases through a bypass valve 39 so that such portion of the gas flow is not made to pass through the canisters. The valve 39 has a disc 40 which is arranged to cover or expose an opening 41 formed in the partition 38 separating the inlet and outlet chambers. The disc 40 is carried at the end of a stem 41 which projects inwardly from an outer threaded cap 42 whose rotation is adapted to produce longitudinal movement of the stem to effect the opening or closing of the passage 41. Adjustment of the bypass valve may be utilized to permit the carbon dioxide content of the bypassed portion of the circulated gas to be retained and, thus, permit a certain level of carbon dioxide content to be maintained in the circuit when this is desired. Such methods of operation, as well as other functional uses of the bypass device, will be readily understood to those skilled in the art.

The assembled canisters 16 are identical in construction, the upper one being designated herein by the numeral 16 and the lower one being designated by the numeral 16' to facilitate reference respectively thereto. The canisters preferably are made of a transparent plastic material. Inasmuch as such materials are essentially nonconductive, it is desirable that provision be made to avoid the accumulation of static electric charges on the surface of the canister. The accumulation of such charges on anesthetic equipment has been known to afford a source of ignition of explosive anesthetic mixtures when such charges, having accumulated to a sufficient extent, are rapidly discharged. In the present apparatus, a metallic cage 17 is arranged to surround the transparent sidewalls of each of the canisters. Such a cage may comprise a series of circumferential wire rings 17' joined together by circumferentially spaced longitudinally extended ribs 17" thereby affording a substantially effective cover which, however, does not interfere with the visual observation of the contents of the canister. The cage 17 may be readily attached and supports the canisters by providing a loop such as that shown at 43, FIG. 5, in the longitudinally connecting rib portions 17' and threading therethrough a mounting screw such as the one shown at 44 in FIG. 3, which may be threaded in a thickened, embossed section of the wall of the canister such as at 45. Each cage 17 has three retaining screw attachments as seen in FIG. 4. The respective cages are effectively grounded to safely discharge any static electric charges that may be applied thereto in a manner which will be hereinafter more fully described.

Each of the canisters has an annular flange 35' at the bottom thereof which is substantially identical to the flange 35 formed at the bottom of the absorber housing 12 and carries a similar seating gasket 34'. Thus, it will be seen that the bottom of each of the canisters is provided with seating means identical to each other and identical to the seating surface of the upper absorber housing so that the upper ends of each of the canisters is received in the identical manner. The bottoms of the canisters have a central perforated area 48 wherein the individual holes are of sufficiently small size to enable the retention within the canister of a charge of granular absorbent material 50 such as a color indicator soda lime while at the same time affording an adequate, effective area for the passage of gas therethrough. The annular flanges 35', as in the case of the flange 35, act as guides to facilitate the accommodation of the open tops of the canisters in seating position and are desirably slightly chamfered for this purpose. In addition, the canister flanges 35' provide a convenient base for the support of the canisters which hold the perforated area 48 away from any supporting surface on which the canisters may be placed when disassembled and, thus, avoid the possibility of occluding the relatively small openings in the perforation 48 with foreign matter.

The bottom seating engagement of the canisters is arranged so that the upper canister rests in the lower canister or extends slightly into the open top thereof. Thus, it will be seen that the bottom of the canister 16, which is identical with the canister 16', includes an outer peripheral portion 52 that projects radially inwardly from the bottom flange 35'. The central perforated area 48 is formed in a central area of the canister bottom which is further recessed from the peripheral region 52. The bottom plate 52 is arranged so that it is slightly lower than the seating gasket 34'. By warrant of such construction, it may be seen that when the upper rim 36 of the lower canister is fully seated against the gasket 34' of the upper canister the horizontal bottom plate portion 52 necessarily projects within the level of the open top of the lower canister. This arrangement is more clearly illustrated in the enlarged partial view of FIG. 6. In this figure, the distance $x$ represents the extent to which the plate portion 52 extends downwardly into the open top of the lower canister 16'. This arrangement is significant in overcoming the difficulty in soda lime canisters of overcoming the tendency for the gas flow through the absorbent material to pass predominantly through the strata adjacent the outer walls of the canister. The resistance to the flow of gas at the interface of the charge bed and the canister wall is generally less than the resistance in the central strata of the bed so that a disproportionate volume of the gas will normally flow through this region. Such unbalanced flow patterns produce a more rapid depletion of these strata of the bed with the result that the visual condition of such strata do not truly represent the average condition of the total bed. These difficulties are substantially minimized by the above-described structural arrangement. This is achieved by completely filling the canisters and leveling the absorbent material with the upper edge. When the canisters are then assembled, it can be seen that the annular surface area 52 presses downwardly on the lower charge bed and compresses the charge by an amount corresponding to the distance $x$ by which the plate 52 is pressed into the charge. Since the charge is composed of granular material, it is sufficiently compressible to accommodate such pressure. While the outer area of the charge bed is compressed under the pressure of the bottom plate area 52 the central perforated region of the bottom plate being recessed does not compress the strata of the charge bed below it. Preferably the bottom of the perforated area of the canister is at a level slightly above the level of the gasket seating surface as indicated by the line S in FIG. 6 which it will be seen also corresponds substantially to the initial level of the charge bed so that there is formed between the surface of the charge and the bottom plate area 48 a small free space designated by the numeral 53. It may be seen that with this arrangement the path of the gases flowing through the peripheral zones of the charge bed includes the horizontal or radial distance underneath the peripheral plate portion 52 in addition to the vertical height of the charge. The central regions of the charge bed on the other hand have a flow path coresponding substantially only to the vertical extent of the path. In this manner, the total length of the outer flow path is comparatively increased and the flow resistance through the charge bed is rendered substantially uniform which, of course, also produces a correspondingly uniform distribution of the gases passing through the charge. It will be seen that the bottom of the canister 16' is constructed in identical fashion so that when it is placed in the uppermost position of the assembled canisters the identical affect is produced in the lower canister. In addition, the bottom wall of the upper absorber housing 12 is constructed substantially identically to the bottom parts of the canisters so that the wall section 52' of the absorber housing accomplishes the same result as the annular sections 52 of the canister bottoms. Thus, the same equalization of flow is produced for the gases conveyed through the charge in the upper canister 16 as well as in the lower canister 16'. It is evident that such desired distribution of the gas is achieved in either direction of flow through the canisters.

The assembled canisters are held at the bottom of the canister 16' by the lower absorber housing 14. The lower housing is substantially hollow having a chamber 56 therein and a top opening 58 which registers with the perforated bottom opening 48 in the canister 16'. An annular lip 60 surrounds the opening 58 and is adapted to receive the bottom of the canister 16' thereon by engagement with the seating gasket 34' in the same manner that the canister 16 is seated on the top of the canister 16'.

The lower absorber housing is adjustably carried on vertical supporting rods 61 and 62, only the rod 61 of which is completely visible in FIG. 3 of the drawings. The rod 62 is best seen by reference to FIG. 5. The rods are threadedly secured at 63 in the upper absorber housing 12 and pass through openings 64 in the lower absorber housing which permits the housing to slide vertically on the supporting rods. The lower ends of the rods are connected by a transverse yoke 65 which is secured by retaining nuts 66. Substantially at the center of the yoke 65 and threadedly received therein is a vertically adjusting and locking screw 67 whose upper bearing end 68 is adapted to be seated in a conical indentation 70 formed in the bottom of the lower absorber housing. It will be seen that by appropriate rotation of the adjusting screw 67, the lower absorber housing may be raised or lowered on the supporting rods relative to the upper absorber housing which, as previously mentioned, is substantially rigidly fixed by the supporting fixture 18. When the adjusting screw 67 has been retracted to its desired extent, the spacing between the upper and lower absorber housing is such as to easily permit the removal of one or both of the canisters 16 and 16'. Of course, the entire manipulation can be done with one hand and is achieved without the necessity of dismantling or completely separating the permanent portions of the absorber apparatus.

The gas circuit between the upper and lower absorber housing when the canisters are in assembled position and tightly held by upward adjustment of the adjusting screw 67 is completed through a flexible corrugated tubing shown at 72 in FIG. 3. The lower end of the tubing is fixedly received on a collar 74 that is seated within an opening 76 communicating with the lower absorber chamber 56. The upper end of the flexible tubing 72 is received on a similar collar 78 that is fixedly seated in an opening 80 communicating with the upper absorber chamber 37. The corrugated flexible tubing 72 provides an extensible conduit which maintains the return flow connection between the upper and lower absorber housings without the severance thereof when the lower housing is adjusted for replacement or handling of the canisters. It will be seen that this expedient affords a great convenience in the operation of the absorber by making it unnecessary to detach or reattach the gas conduits extending between the relatively movable portions of the absorber and also affords an added degree of safety since such further steps are not involved. The flexible conduit may be secured at its upper and lower ends simply by elastic means. Thus, the tubing being normally of a conductive rubber material can be stretched over the respective retaining collars 74 and 78 and retained thereon by friction. The corrugations of the tubing, of course, readily expand when the lower housing is dropped to thereby accommodate such adjustment.

In order to safeguard the flexible conduit and protect it against possible inadvertent disconnection by accidental impact thereagainst a vertical tubular member 82 is provided therein. The tube 82 rests at its lower end on a shoulder 83 formed in the lower opening 76 and is otherwise freely movable within the upper and lower collars 74 and 78 and within the flexible tube 72. Preferably the tube 82 extends to just short of contact with the upper absorber housing when the lower housing is in its uppermost operative position such as shown in FIG. 3. This prevents any possible obstruction to the adjustment of the absorber housing. It may be seen that if the corrugated tube 72 receives an accidental impact in a transverse direction the force thereof will be largely absorbed by the vertical tube 82 and transmitted respectively to the upper and lower absorber housing portions and that such impact will not affect in any significant way the flexible tube itself. Of course, when the lower housing is dropped, the tube normally will remain in its supported position against the lower shoulder 83 but its upper end will not come below a slight overlap with the collar 78. The position of the top of the tube 82 in the lower position of the lower absorber housing 12 is indicated in dotted lines in FIG. 3. This arrangement insures alignment of the tube 82 and prevents obstruction to the adjustability to the lower absorber housing.

The vertical adjustability of the lower absorber housing above-described and the provision of replaceable and reversible transparent canisters is achieved in accordance with the present invention without sacrificing the advantage of maintaining a reliable electrical grounding of the protective cages 17 of the canisters and without necessitating separate manipulative steps to achieve this result. This is accomplished by the provision of a vertically extending spring element 86 seen in FIG. 5 which is carried on the vertical rod 62. It will be seen that the spring 86 is an elongated coil spring that is provided along its length with preformed outwardly bulging configurations designated at 87 and 88. The bottom of the spring rests under its own weight against the lower absorber housing 12, thus, insuring at all times a metal-to-metal contact therewith which, in turn, is in electrical conductive contact at all times with the upper absorber housing through the vertical supporting rods 61 and 62. In addition, the coil spring 86 may be of a sufficient length that in the operative positioning of the upper and lower absorber housings the coil is placed slightly under compression so that both of its ends are in metal-to-metal contact respectively with the upper and lower absorber housings. The radial extent of the bulged portions 87 and 88 of the spring are such that with the canisters in proper seated position in the absorber the horizontally extending rib elements 17' of the protective cages for the canisters are obstructed by the spring. The net effect when placing the canisters in assembld position is that the cages bear against the bulged portions of the spring and deflect them aside with, however, a permanent contact between the spring and the cages being assured by the resilience of the spring. It is apparent that this arrangement is extremely simple and that the desired contact between the cages and the spring occurs automatically without any manipulation or adjustment of the absorber parts.

In the operation of the absorber device shown on the drawings, and as hereinabove described, both canisters are provided with a desired charge of absorbent material which preferably is substantially identical in volume and adsorptive capacity.

In the normal and preferred usage of the adsorber the direction of the gas flow is downwardly through the respective absorbent charges. This gas enters chamber 30, flows downwardly in succession through canisters 16 and 16' to chamber 56 in the lower absorber housing, upwardly through tube 72 to chamber 37 and thence from the absorber outlet 21. Following a period of use, it will be apparent that the upper charge will receive gases containing the greater concentration of carbon dioxide and that the upper charge bed will become depleted within a given time while the lower charge bed is still capable of a considerable amount of absorption. The fact of the depletion of the upper bed is readily apparent by direct observation of the charge bed through the transparent walls of the canister. In the preferred mode of operation, the bottom housing 14 is then lowered and the upper canister 16 removed. A replacement canister with a fresh charge or the same canister with a new charge of material is then substituted in the lower position while the canister 16' previously in the lower position is raised to the upper position. The absorber is then continued in use and the same operation repeated when the canister 16' now in the upper position has become exhausted.

It will be seen that by this mode of operation substantially the complete absorptive capacity of the charge material is utilized. On the other hand, there is no danger of improper operation of the absorber during a period when the absorptive material has become depleted prior to replacement since a substantial portion of the total bed represented by the lower canister is always available as a safeguard against such an occurrence. The unique arrangement of the above-described absorber permits such replacement and manipulation of the separable canisters to achieve this desired mode of operation while at the same time facilitating and avoiding the inherent cumbersome steps that would be necessary for this result with absorptive devices such as have heretofore been known and used.

The present invention is not limited to the specific embodiment herein described, but may be used in other ways without the departure from its spirit as defined by the following claims.

I claim:

1. A respiratory gas absorber device comprising upper and lower housing members disposed in confronting relation and movable toward and away from each other to receive therebetween an assembled series of at least two nested, separable canisters containing absorbent material effective to remove carbon dioxide upon contact with respiratory gases passed between said upper and lower housings and through said canisters, a gas chamber in each of said housings and openings respectively in confronting faces of said housings communicating with each of said chambers adapted to receive therebetween the top and bottom of said nested canisters, an annular seating surface surrounding said opening in said upper housing, a wall portion of said upper housing in which said opening is formed forming a partition member projecting laterally inwardly and downwardly relative to said annular seating surface, each of said canister members comprising a cylindrical open topped vessel having an upper seating edge adapted to be received in a substantially gas-tight manner against said annular seating surface of said upper housing and having an annular seating surface at the bottom thereof corresponding substantially with said annular seating surface formed on said upper housing and a perforated bottom opening encompassed within said canister annular seating surface in a transversely extending bottom portion of said canister forming a partition projecting laterally inwardly and downwardly relative to said canister annular seating surface, said lower housing having an annular shoulder formed in the confronting face thereof surrounding said opening therein, said upper seating edges of said canisters and said annular shoulder of said bottom housing being arranged to interchangeably receive the annular seating surfaces of the bottoms of said canisters and of said upper housing in seating engagement, said partition member of said upper housing extending downwardly into the open top of the uppermost of the assembled canisters and the partition members of each of said canisters projecting downwardly into the open top of the next lower of said assembled canisters effecting thereby a compression of an annular outer strata of the absorbent charge material in each of said canisters to effectively equalize the distribution of the gas flow therethrough, and extensible conduit means extending between said upper and lower housings exteriorly of said canisters and between connecting means laterally disposed with respect to said openings in said upper and lower housings, said extensible conduit means effectively accommodating separation of said upper and lower housings to permit replacement of one or more of said canisters without breaking the gas connection between said housings therethrough, and respiratory gas inlet and outlet connections on one of said housings including gas passage means forming a respiratory gas circuit in which said respiratory gas is conducted from one of said housings to the other through said assembled canisters and returned to said housing through said extensible conduit means when said housings and canisters therebetween are in seated relation.

2. An anesthetic absorber for removing carbon dioxide from respiratory gases comprising canister means for holding a charge of absorbent material, said canister means having top and bottom openings, respectively, to permit the passage of respiration gases longitudinally through said canister means in contact with the absorbent contained therein, upper and lower absorber housings mounted to permit relative movement toward and away from each other, said housings being arranged to engage the top and bottom openings, respectively, of said canister means and including means for supporting said upper and lower housings to permit said housings to disengage from said canister means to detachably retain said canister means therebetween, gas chambers in each of said upper and lower housings having corresponding canister-receiving openings in opposed confronting faces of said housings respectively, arranged to register respectively and form gas-tight connections with the top and bottom openings of said canister means, one of said absorber housings carrying a first conduit communicating with said chamber therein and a second conduit communicating with a second separate chamber therein, said first and second conduits being adapted to be connected with a respiration circuit and forming inlet and outlet conduits for the circulation of respiratory gases through the absorber, and an extensible conduit external of said canister means extending between and secured at its opposite ends to said upper and lower housings, said extensible conduit communicating at its opposite ends with said second chamber of one of said absorber housings and with said chamber of said other absorber housing, respectively, through passages laterally disposed with respect to said canister-receiving openings, and forming a fluid connection between said upper and lower housings which is operative to expand and contract in length so as to remain intact independently of the movement of said upper and lower absorber housings required to disengage said canister means.

3. An anesthetic absorber in accordance with claim 2 wherein said canister means comprises a plurality of separable, longitudinally assembled cylindrical canisters, each of said canisters having at least portions of the cylindrical sidewalls thereof made of transparent nonconductive material through which the contents of said canisters are visible, each of said canisters carrying electrically conductive cage members forming an open network barring free access to said transparent nonconductive portions of said sidewalls, and wherein a vertically elongated, resilient metallic coil is supportably carried between said upper and lower absorber housings having portions along the length thereof in which the convolutions of said coil are of greater diameter than average and which project laterally therefrom, said portions of said coil in the assembled relation of said canisters being deflected by contact with said cage members and maintained in contact with said cage members under a resilient force created by such deflection.

4. An anesthetic absorber in accordance with claim 2 wherein said first and second gas conduits are supported in said upper housing, and said bottom housing is adjustably supported by said upper housing by vertically extending guide members including locking means adjustable to raise and lower said lower housing and to secure said canister means between said upper and lower housings.

5. An anesthetic absorber in accordance with claim 4 wherein said vertically extending guide members are interconnected at their lower ends by a cross-piece having a relatively adjusted threaded member supported therein which is adapted to bear against said lower housing to affect the raising and lowering thereof.

6. A carbon dioxide absorber in accordance with claim 5 wherein said canister means comprises a plurality of substantially identical cylindrical canister members each having an open top and a perforated bottom plate and arranged in vertically assembled relation wherein said upper and lower housings engage respectively the top and bottom of said assembled canisters.

7. A carbon dioxide absorber for anesthetic administering apparatus comprising an upper housing having a chamber therein, an opening from said chamber formed in a bottom wall of said housing, a lower housing adjustable supporting means carried by said upper housing for adjustably supporting said lower housing for movement toward and away from said upper housing, said lower housing having a chamber therein and an opening from said chamber through a top wall of said bottom housing substantially in confronting relation with the opening in said upper housing, canister means secured between said upper and lower housings having gas ports at the top and at the bottom thereof in registry respectively with the openings in said upper and lower housings, said adjustable supporting means of said upper housing accommodating movement of said lower housing, alternatively, to secure or disengage said canister means, a second chamber in said upper housing, extensible conduit means external of said canister means connecting said second chamber with said chamber in said lower housing and gas inlet and outlet means on said upper housing communicating respectively with said chambers therein, said extensible conduit means extending between and secured at its opposite ends to said upper and lower housings and communicating at its opposite ends with said second chamber and with said chamber in said lower housing, respectively, through passages laterally disposed with respect to said canister-receiving openings and forming a fluid connection between said upper and lower housings which is operative to expand and contract in length so as to remain intact independently of the movement of said upper and lower absorber housings required to disengage said canister means.

References Cited in the file of this patent

UNITED STATES PATENTS

| | | |
|---|---|---|
| 1,422,211 | Lamb | July 11, 1922 |
| 1,481,957 | Cederberg | Jan. 29, 1924 |
| 1,725,893 | Yablic | Aug. 27, 1929 |
| 2,267,768 | Tobiasson | Dec. 30, 1941 |
| 2,456,606 | Martin | Dec. 14, 1948 |
| 2,837,413 | Hay | June 3, 1958 |
| 2,918,356 | Hay | Dec. 22, 1959 |